United States Patent [19]
Sako et al.

[11] Patent Number: 5,138,598
[45] Date of Patent: Aug. 11, 1992

[54] OPTICAL DISK HAVING RELATIVELY WIDE RAM TRACKS AND RELATIVELY NARROW ROM TRACKS

[75] Inventors: Yoichiro Sako, Chiba; Tamotsu Yamagami, Kanagawa, both of Japan

[73] Assignee: Sony Corporation, Tokyo, Japan

[21] Appl. No.: 643,226

[22] Filed: Jan. 22, 1991

[30] Foreign Application Priority Data

Jan. 25, 1990 [JP] Japan .................... 2-15766
Jan. 25, 1990 [JP] Japan .................... 2-15767

[51] Int. Cl.⁵ .................................. G11B 5/09
[52] U.S. Cl. ........................ 369/47; 369/275.3; 369/272; 369/13; 235/454
[58] Field of Search ............. 369/47, 275.1, 275.2, 369/275.3, 275.4, 275.5, 276, 277, 278, 279, 44.26, 109, 100, 111, 48, 49, 50, 51, 13; 235/487, 491, 454

[56] References Cited

U.S. PATENT DOCUMENTS

| | | | |
|---|---|---|---|
| 4,744,074 | 5/1988 | Imanaka et al. | 369/278 |
| 4,893,298 | 1/1990 | Pasman et al. | 369/44.37 |
| 4,910,725 | 3/1990 | Drexler et al. | 369/47 |
| 4,947,384 | 8/1990 | Suzuki et al. | 369/275.1 |

FOREIGN PATENT DOCUMENTS

| | | | |
|---|---|---|---|
| 419239A | 3/1991 | European Pat. Off. | 369/47 |
| 63-200319 | 8/1988 | Japan | 369/275.1 |
| 114743 | 1/1989 | Japan | 369/275.4 |
| 1-296443 | 11/1989 | Japan | 369/275.4 |

*Primary Examiner*—Roy N. Envall, Jr.
*Assistant Examiner*—Thai Tran
*Attorney, Agent, or Firm*—Lewis H. Eslinger; Donald S. Dowden

[57] ABSTRACT

A record medium having a pre-formed recording track with a recordable area on the recording track in which data is recorded and an area on the recording track used exclusively for reproduction in which data is pre-recorded by displacing the track in the track width direction and in which the track width of the data recordable area is wider than that of the area used exclusively for reproduction, so that crosstalk is minimized and the carrier-to-noise ratio and error rate when reproducing recorded data are improved.

9 Claims, 4 Drawing Sheets

OPTICAL DISK HAVING RELATIVELY WIDE RAM TRACKS AND RELATIVELY NARROW ROM TRACKS

BACKGROUND OF THE INVENTION

1. Field of the Invention

The present invention relates generally to record media and, more particularly, is directed to a record medium suitably applied, for example, to a magneto-optical disk, an optical disk and so on.

2. Description of the Prior Art

An an optical record medium, a magneto-optical disk, has been developed in which a tracking guide groove of spiral or concentric shape is pre-formed on a disk and this pre-formed guide groove or the land portion between adjacent guide grooves is utilized as a recording track, whereby data can be recorded in and reproduced from the recording track along the track direction using the magneto-optic effect. In such record medium, by optically detecting the guide groove, data is recorded and reproduced in a magneto-optic fashion under the application of a tracking servo.

Incidentally, in such record medium, if data such as an operating system, a fundamental dictionary or the like used only for reproduction are supplied in the form such that they are pre-recorded on the record medium, then it becomes very convenient not only for the maker to supply program software but also for the user to use such record medium. For this reason, a record medium such as a disk or card is proposed, in which an area from which data is read out only (hereinafter referred to as a ROM (read only memory) area) and an area in which data can be recorded (hereinafter referred to as a RAM (random access memory) area) are provided in a mixed fashion.

FIG. 1 shows an example of a magneto-optical disk provided as a record medium in which data for only reproduction is pre-recorded. In FIG. 1, reference numeral 1 depicts a magneto-optical disk, in which there are provided a so-called RAM area 1a in which a signal can be recorded and a so-called ROM area 1b from which a signal can be read out only. In that case, within the RAM area 1a, a pre-formed guide groove or a land portion between the guide grooves is employed as a recording track 1a', and data is recorded on the recording track 1a, in a magneto-optic fashion. Further, on the ROM area 1b, there is provided a track 1b' in which data for only reproduction is pre-recorded in the form of, for example, a pit train. While the RAM area 1a and the ROM area 1b are provided in the perfectly separated condition as shown in FIG. 1, it is frequently observed that the track 1a' of the RAM area 1a and the track 1b, of the ROM area 1b are provided in a mixed state.

Instead of the above-mentioned magneto-optical disk, a card type record medium is proposed, in which a RAM area and a ROM area are provided in a mixed state. FIG. 2 shows an example of such previously-proposed card type record medium.

As shown in FIG. 2, a magneto-optical card 20 is composed of a RAM area 21 and a ROM area 22, wherein a plurality of grooves are formed in the RAM area 21 at predetermined intervals and a plurality of pit trains are formed in the ROM area 22 at predetermined intervals.

However, in the record medium in which the RAM area and the ROM area are provided in the mixed state, different tracking servo must be applied to the RAM area in which data is recorded in the grooves by utilizing magneto-optic effect than to the ROM area in which data is recorded in the pit trains. For this reason, a continuous tracking servo cannot be applied to such record medium by a single tracking method, thus a recording and reproducing apparatus having a complicated-arrangement for the tracking function is required.

To solve the aforenoted problem, the assignee of the present application has previously proposed the following record medium (see U.S. Pat. application Ser. No. 568,963), in which data is recorded on the ROM area by means of the displacement of the groove in its width direction, grooves are provided both in the RAM area and the ROM area and the tracking servo can be effected in both RAM and ROM areas on the basis of the detection of the grooves.

If the grooves are provided on the RAM and ROM areas under the same condition, there is then the disadvantage that data cannot be reproduced satisfactorily in any one of the RAM and ROM areas. For example, if the groove is provided on the RAM area in width and at a pitch so that a signal can be excellently recorded in the RAM area using to the magneto-optic effect, then a crosstalk occurs in an adjacent track in the ROM area due to the displacement of the groove in the width direction, thus hindering a signal from being reproduced from the ROM area satisfactorily. If on the other hand the groove is formed in the ROM area in width and at a pitch such that a signal can be satisfactorily reproduced from the ROM area, the recording of a signal utilizing the magneto-optic effect cannot be effected sufficiently in the RAM area, which increases an error rate of a reproduced signal.

OBJECTS AND SUMMARY OF THE INVENTION

Accordingly, it is an object of the present invention to provide an improved optical disk which can eliminate the aforenoted shortcomings and disadvantages encountered with the prior art.

More specifically, it is an object of the present invention to provide an optical disk in which data can be reproduced both in a random access area and a read only memory area.

It is another object of the present invention to provide an optical disk in which crosstalk can be avoided.

It is a further object of the present invention to provide an optical disk in which a carrier-to-noise ratio and an error rate in reproducing recorded data can be improved.

It is still a further object of the present invention to provide an optical disk in which a high-speed access can be carried out with ease.

According to a first aspect of the present invention, an optical record medium is provided, from which recorded data is read out by an optical means. This optical record medium is comprised of a recording track pre-formed on the optical record medium, a recordable area formed on the record track and in which data is recorded along a track direction, and an area used exclusively for reproduction in which data is pre-recorded by displacing a track in the track width direction in response to data, wherein a track width of the data recordable area is made wider than that of the area used exclusively for reproduction.

In accordance with a second aspect of the present invention, an optical record medium is provided, from which recorded data is read out by an optical means. This optical record medium is comprised of a recording track pre-formed on the optical record medium, a recordable area formed on the record track and in which data is recorded along a track direction, and a control information area in which a control information for controlling the data is pre-recorded, the recordable area and the control information area being formed alternately, in which the control information is pre-formed by displacing the recording track in the width direction in response to the control data and a track width of the data recordable area is made wider than that of the control information area.

Preferably, the frequency of the data recorded by displacing the track in the track width direction is sufficiently higher than that of a tracking error signal obtained by scanning the track.

The above, and other objects, features and advantages of the present invention will become apparent in the following detailed description of illustrative embodiments to be read in conjunction with the accompanying drawings, in which like reference numerals are used to identify the same or similar parts in the several views.

DETAILED DESCRIPTION OF THE PREFERRED EMBODIMENTS

An embodiment of a record medium such as an optical disk according to the present invention will hereinafter be explained with reference to FIGS. 3 and 4.

Figure 1:
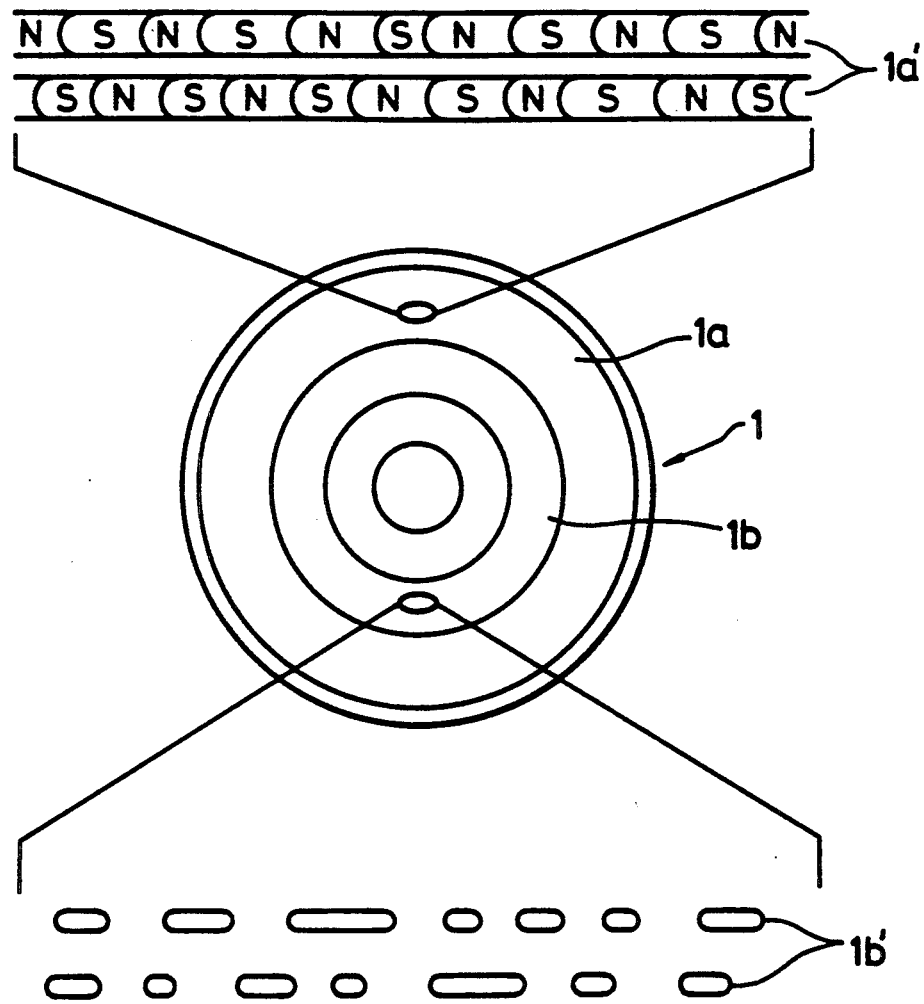
FIG. 1 is a schematic diagram showing an example of a conventional record medium such as a magneto-optical disk.
Figure 2:
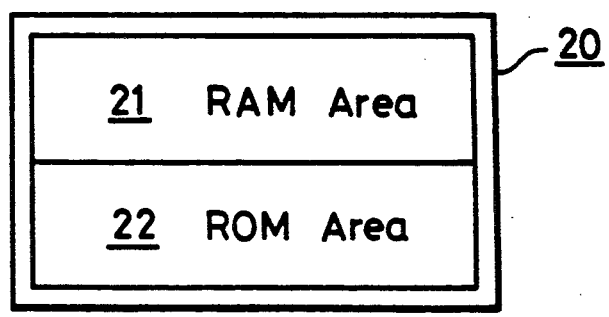
FIG. 2 is a schematic diagram showing another example of a conventional record medium such as a magneto-optical card.
Figure 3:
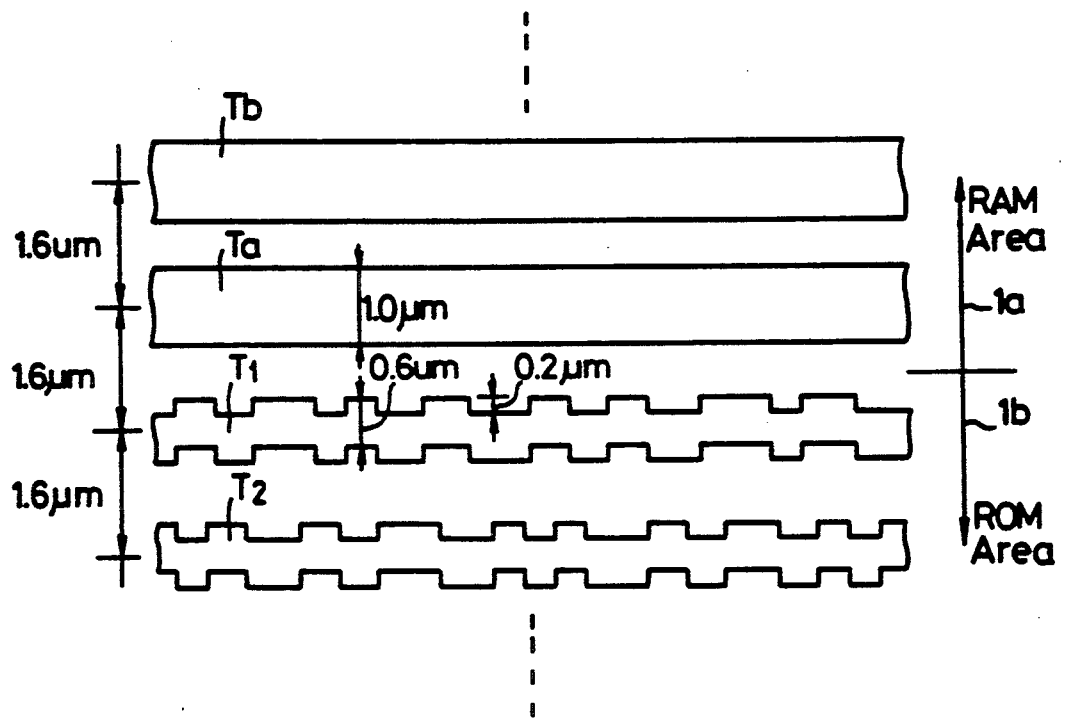
FIG. 3 is a schematic diagram used to explain the condition that the tracks are formed in an embodiment of a record medium such as an optical disk according to the present invention.

FIG. 3 schematically shows the condition that recording tracks are formed on an embodiment of the record medium such as a magneto-optical disk according to the present invention. In the magneto-optical disk of this embodiment, a vertical magnetization film having, for example, a magneto-optic effect is formed on a transparent substrate, and tracking guiding grooves (so-called grooves) of spiral or concentric shape are pre-formed on this magneto-optical disk. These grooves are employed as recording tracks (these grooves are represented by straight lines in FIG. 3 for better understanding). In that case, as shown in FIG. 3, the recording region of the magneto-optical disk of this embodiment is composed of the RAM area 1a and the ROM area 1b, and, for example, the outer peripheral side of the magneto-optical disk is used as the RAM area 1a and the inner peripheral side thereof is used as the ROM area 1b. FIG. 3 shows a boundary portion between the RAM area 1a and the ROM area 1b. In this embodiment, the grooves are formed on both the RAM area 1a and the ROM area 1b, and various data are pre-recorded on the the width direction thereof when this magneto-optical disk is formed. More specifically, as shown in FIG. 3., grooves T1, T2, ... are formed on the ROM area 1b as recording tracks at a pitch of 1.6 $\mu$m and each groove is 0.6 $\mu$m wide. Then, grooves of 0.6 $\mu$m wide are displaced by a displacement amount of 0.2 $\mu$m in the width direction in the direction perpendicular to the longitudinal direction of the groove, thereby various data being pre-recorded.

Then, grooves Ta, Tb, ... are formed on the RAM area 1a as recording tracks at a pitch of 1.6 $\mu$m similarly to the ROM area 1b. In that case, the groove width of each of grooves Ta, Tb, ... on the RAM area 1a is 1.0 $\mu$m, which is wider than the width of each groove on the ROM area 1b. Various data are recorded within the respective grooves Ta, Tb, ... of 1.0 $\mu$m wide according to the magneto-optic effect.

An arrangement of a reproducing apparatus which reproduces a signal from the thus constructed magneto-optical disk will be explained next with reference to a block diagram forming FIG. 4. In the example of FIG. 4, an arrangement in which various data are recorded on the RAM area 1a by utilizing a magneto-optic effect will not be explained.

Figure 4:
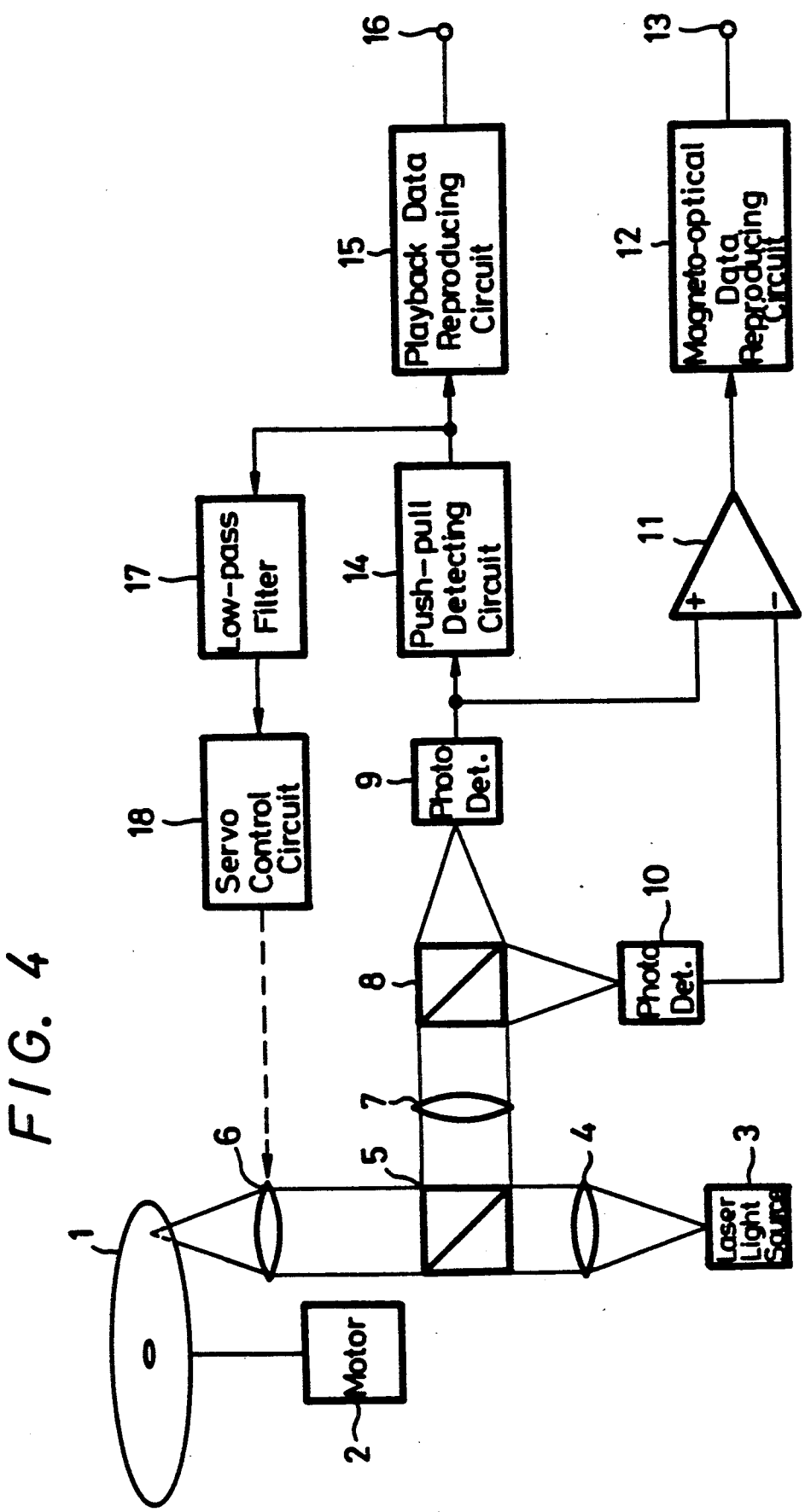
FIG. 4 is a schematic block diagram showing an example of an optical disk reproducing apparatus to which the present invention is applied.

Referring to FIG. 4, there is provided a magneto-optical disk 1 in which the RAM area 1a and the ROM area 1b are formed as the grooves as described above. This magneto-optical disk 1 is rotated by a spindle motor 2 at a constant linear velocity (CLV) or at a constant angular velocity (CAV). A laser beam emitted from a laser light source 3 for recording and/or reproduction is collimated as a parallel beam by a collimator lens 4 and illuminates the magneto-optical disk 1 via a beam splitter 5 and an objective lens 6 of a so-called dual axis type device for focusing and tracking. A reflected beam from the magneto-optical disk 1 is split by the beam splitter 5 and introduced into a polarizing beam splitter 8 via an optical system 7 such as a ½ wavelength plate, a conversion lens, a cylindrical lens or the like. The incident laser beam is split by the polarizing beam splitter 8 into a P-polarized component and an S-polarized component and introduced into photo detectors 9 and 10 which are used to detect a tracking error signal, a focusing error signal and a magneto-optical signal (hereinafter simply referred to as an MO signal).

Outputs from the photo detectors 9 and 10 are supplied to a differential amplifier 11 and a difference between both outputs is calculated by the differential amplifier 11 to thereby extract the MO signal recorded on the magneto-optical disk 1 in a magneto-optic fashion. The thus extracted data signal is supplied to a magneto-optical recording data reproducing circuit 12 and processed by the magneto-optical recording data reproducing circuit 12, whereby a signal reproduced from the RAM area 1a of the magneto-optical disk 1 is fed to a terminal 13.

The photo detector 9 is formed of a sensor element whose light receiving portion, for example, is divided into four photo detecting portions A push-pull signal is detected by a push-pull detecting circuit 14 as a difference between the respective light receiving portions. This push-pull signal is supplied to a playback data reproducing circuit 15 and is processed by the playback data reproducing circuit 15, whereby a signal reproduced from the ROM area 1b of the magneto-optical disk 1 is fed to a terminal 16.

Further, the push-pull signal from the push-pull detecting circuit 14 is supplied to a low-pass filter 17, in which servo information is extracted from the push-pull signal, and this servo information is fed to a servo control circuit 18. The servo control circuit 18 controls the objective lens 6 on the basis of servo information, thereby performing the tracking control and the focusing control.

Since the data are reproduced from the RAM area 1a and the ROM area 1b of the magneto-optical disk 1, the servo control circuit 18 performs the tracking servo control in both of the RAM area 1a and the ROM area 1b of the magneto-optical disk 1 on the basis of the grooves provided as the recording tracks, thereby a continuous tracking control can be performed for both the RAM area 1a and the ROM area 1b by the same tracking servo. Therefore, a stable tracking control can be effected in any one of the cases that data is recorded on and the RAM area 1a, data is reproduced from the RAM area 1a and that data is reproduced from the ROM area 1b.

Furthermore, in this embodiment, the width of groove on the ROM area 1b is narrower than that of the groove on the RAM area 1a as described above so that, although the data is recorded on the magneto-optical disk 1 by the displacement of grooves in the width direction, the crosstalk which exerts a bad influence on the reproduction of data can be prevented from being caused in the adjacent grooves. More precisely, even when the displacement amount in the width direction, that is, 0.2 μm is added to the width of 0.6 μm of each of the grooves T1, T2, . . . , of the ROM area 1b, displaced width of the grooves T1, T2, . . . is narrower than the track width of 1,0 μm of the grooves of the RAM area 1a. For example, the width of the land portion between the grooves T1 and T2 can be prevented from being reduced significantly by the displacement in the width direction, thus preventing the crosstalk amount from being increased. Alternatively, when the track pitch is constant at the boundary portion between the RAM area 1a and the ROM area 1b shown in FIG. 3, the width direction displacement of the groove T1 of the ROM area 1b can be prevented from exerting a bad influence upon the adjacent groove Ta of the adjacent RAM area 1a as the crosstalk.

Conversely, since the width of the groove on the RAM area 1a is made wider than that of the groove on the ROM area 1b, it is possible to increase the width of the groove in which data is recorded by the MO signal. Thus, a carrier-to-noise (C/N) ratio and error rate in reproducing the recorded data can be improved.

While the recording of data in the RAM area 1a is performed by a so-called groove recording set within the groove in the above-described embodiment, it is possible to perform a so-called land recording in which data is recorded in the land portion between the adjacent grooves.

While the present invention is applied to the magneto-optical disk in which the RAM area 1a and the ROM area 1b are provided perfectly independently as described above, the present invention is not limited thereto and may be applied to such a magneto-optical disk in which the RAM area 1a and the ROM area 1b are provided in a mixed state. In that case, the RAM area 1a and the ROM area 1b can be formed by grooves of the same track pitch, thus achieving remarkably improved effects.

Further, as described in U.S. Pat. application Ser. No. 585,177, such an optical disk system is proposed, in which control data such as a synchronizing signal, address information and so on and various arbitrary data are alternately recorded on recording tracks and the administration of data and so on are performed on the basis of the control data. The present invention can be applied to this optical disk system in which data are recorded and reproduced in a block or sector on the basis of the control data.

Figure 5:
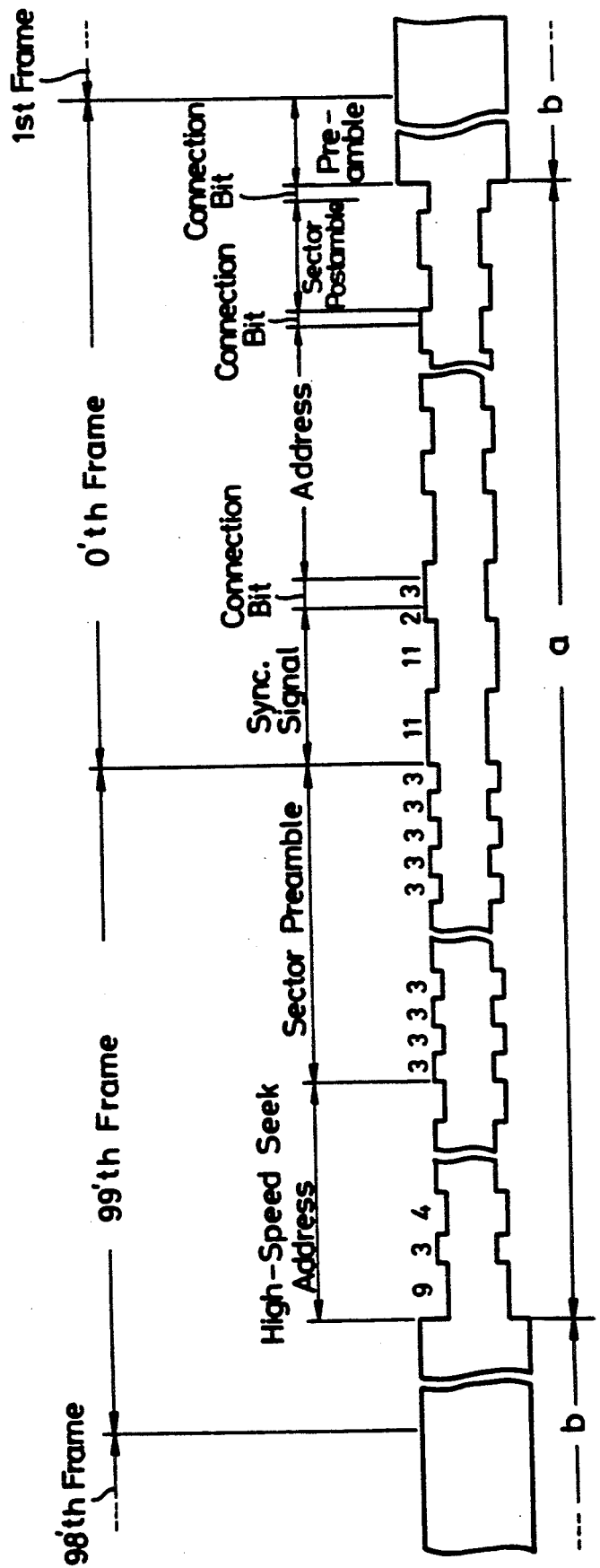
FIG. 5 is a schematic block diagram showing an example of a recording format, and to which references will be made in explaining another embodiment of the optical disk according to the present invention.

FIG. 5 shows a recording format of a recording track on a magneto-optical disk as a second embodiment of the present invention.

In the magneto-optical disk of this embodiment on which the above recording track is formed, a vertical magnetization layer or film having, for example, a magneto-optic effect is formed on a transparent substrate, and guide grooves (i.e., so-called grooves) for tracking are pre-formed on the magneto-optical disk in a spiral or concentric shape. These grooves are employed as recording tracks. In that event, various data are recorded in the unit of 100 frames ranging from 0'th frame to 99'th frame and a control data recording area a is provided at every 100 frames.

As shown in FIG. 5, this control data recording area a has a length of one frame ranging from the ending end portion of 99'th frame to the starting end portion of 0'th frame and in which various kinds of control data are pre-recorded by the width direction displacement when the magneto-optical disk is formed. More precisely, a high-speed seek address, a sector preamble, a synchronizing signal, a connection bit, an address, a connection bit, a sector postamble and a connection bit are formed in the control data recording area a in that order from the 99'th frame side. Also, the portion from the end of this control data recording area a to the end of the 0'th frame is employed as a preamble for magneto-optical recording.

Figure 6:
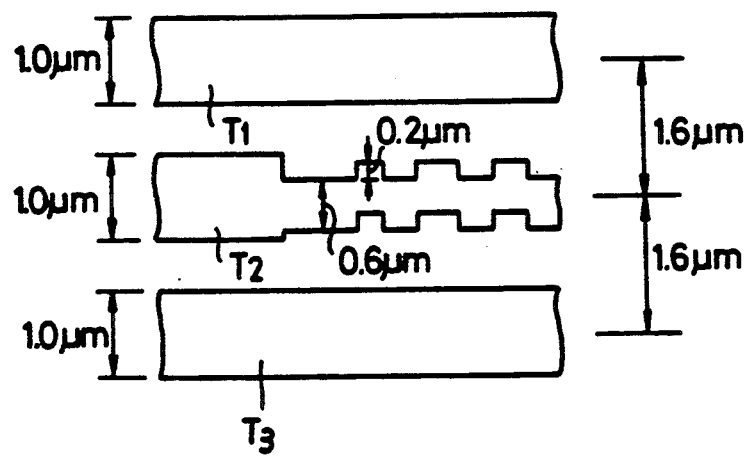
FIG. 6 is a schematic diagram showing the condition that the tracks are arrayed, and to which references will be made in explaining another embodiment of the present invention.

Further, in this second embodiment, as, for example, shown in FIG. 6, a groove width of a data recordable area b other than the control data recording area a is selected to be 1.0 μm and the width of the control data recording area a is selected to be 0.6 μm which is narrower than the above-mentioned groove width of area b. The groove of 0.6 μm wide is displaced in the width direction by the displacement amount of 0.2 μm in the direction perpendicular to the longitudinal direction of the groove, thereby the above-mentioned various control data being recorded. Then, various data are recorded in the data recordable area b having the groove width of 1.0 μm by a magneto-optic effect. FIG. 6 shows the condition that adjacent tracks are formed, and tracks (grooves) T1, T2, T3 . . . are formed at a pitch of 1.6 μm. In the example of FIG. 6, the control data recording area is formed on the central track T2 as shown therein.

Also in this embodiment, the groove width of the control data recording area a is narrower than that of the data recordable area b as described above so that, although the control data is recorded on the control data recording area a by the width direction displacement of grooves, the crosstalk which exerts a bad influence on the reproduction of data in the adjacent grooves can be prevented. More precisely, as shown in FIG. 6, even when the displacement amount in the width direction, that is, 0.2 μm is added to the width of 0.6 μm of the control data recording area a of the track T2, the width of the control data recording area a of the track T2 . . . is narrower than the width of 1.0 μm of the data recordable area b. Accordingly, for example, the width of the land portion between the track T2 and the adjacent tracks T1 and T3 can be prevented from being reduced significantly by the width direction displacement, thus preventing the crosstalk amount from being increased.

Conversely, since the width of the data recordable area b is made wider than that of the control data recording area a, it is possible to increase the width of the groove in which data is recorded by the MO signal. Thus, the C/N ratio and the error rate in reproducing the recorded data can be improved.

Further, the control data recording area a formed at every 100 frames can be searched with ease because the groove width thereof is narrower than that of the data recordable area b, which can make it possible to detect the address information recorded on the control data recording area a at high speed, thus the high-speed access being effected with ease.

While the recording of data in the data recordable area b is performed by a so-called groove recording set within the groove in the above-described embodiment, it is possible to perform a so-called land recording in which data is recorded in the land portion between the adjacent grooves.

The present invention is not limited to the magneto-optical disk of the above-mentioned embodiments and can be applied to various record media such as an organic pigment-system optical disk, various kinds of write once optical disks, an erasable optical disk, an optical card, a magneto-optical card and so on.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim:

1. An optical record medium from which recorded data is read out by an optical means, comprising:
   a recording track pre-formed on said optical record medium;
   a recordable area formed on said recorded track and in which data is recorded along a track direction; and
   an area used exclusively for reproduction in which data is pre-recorded by displacing the recording track in the track width direction in response to data, wherein said data recordable area has a track width greater than that of said area used exclusively for reproduction.

2. An optical record medium according to claim 1, in which a frequency of said data recorded by displacing said track in the track width direction is sufficiently higher than that of a tracking error signal obtained by scanning said track.

3. An optical record medium according to claim 2, in which said optical record medium is a magneto-optical disk.

4. An optical record medium according to claim 2, in which said optical record medium is an optical card.

5. An optical record medium from which recorded data is read out by an optical means, comprising:
   a recording track pre-formed on said optical record medium;
   a recordable area formed on said recording track and in which data is recorded along a track direction; and
   a control information area formed on said recording track in which control information is pre-recorded, said recordable area and said control information area being formed alternately along said recording track, in which said control information is formed by displacing said recording track in the track width direction based on said control information and a track width of said recordable area is wider than a track width of said control information area.

6. An optical record medium according to claim 5, in which a frequency of said data recorded by displacing said track in said track width direction is sufficiently higher than that of a tracking error signal obtained by scanning said track.

7. An optical record medium according to claim 6, in which said recording track is displaced in the track width direction to record, as a part of said control information, a synchronizing signal of said data.

8. An optical record medium according to claim 6, in which said recording track is displaced in the track width direction to record address information as a part of said control information.

9. An optical record medium according to claim 6, in which said optical record medium is a magneto-optical disk.

* * * * *